2 Sheets--Sheet 1.

J. RYNEARSON.

Harvester-Rake.

No. 6,349.

Reissued March 23, 1875.

Witnesses:

Alex Mahon

John G. Center

Inventor:

John Rynearson by A. M. Smith attorney

2 Sheets--Sheet 2.

J. RYNEARSON.

Harvester-Rake.

No. 6,349.

Reissued March 23, 1875.

*Witnesses:*

Alex Mahon
John G. Center

*Inventor:*

John Rynearson
by A. M. Smith
Attorney.

UNITED STATES PATENT OFFICE.

JOHN RYNEARSON, OF FARMINGTON, ILLINOIS, ASSIGNOR TO JOHN H. ELWARD, OF ST. PAUL, MINNESOTA.

IMPROVEMENT IN HARVESTER-RAKES.

Specification forming part of Letters Patent No. 36,800, dated October 28, 1862; reissue No. 6,319, dated March 23, 1875; application filed March 5, 1875.

*To all whom it may concern:*

Be it known that I, JOHN RYNEARSON, of Farmington, in the county of Fulton and State of Illinois, have invented certain new and useful Improvements in Machines for Harvesting Grain; and I do hereby declare that the following is a full and exact description of the same, reference being had to the accompanying drawings making part of this specification, in which—

Figure 1:
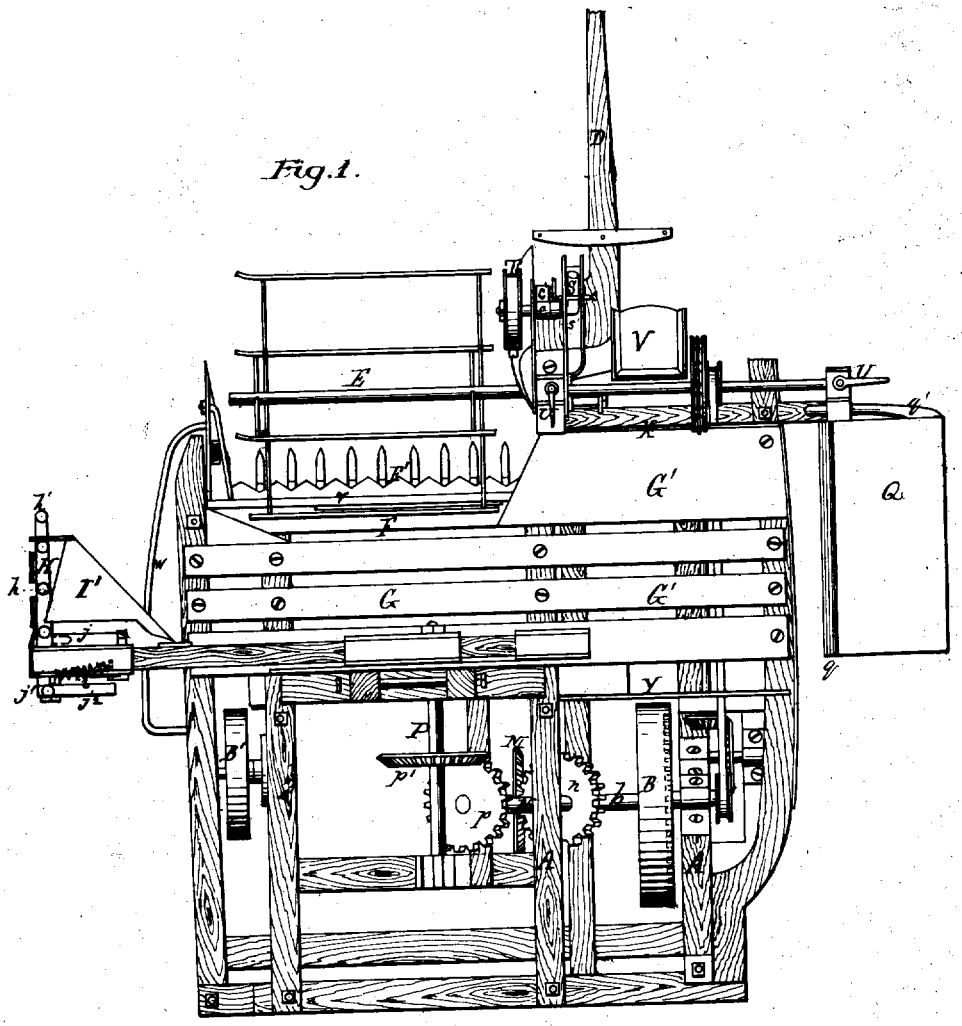
Figure 3:
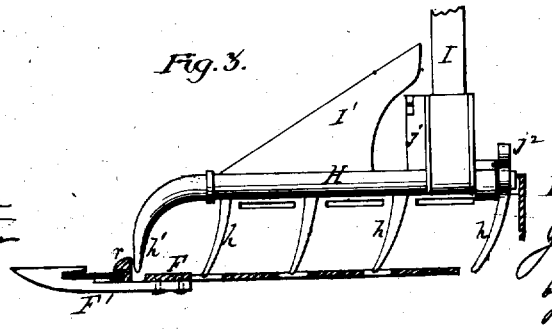
Figure 2:
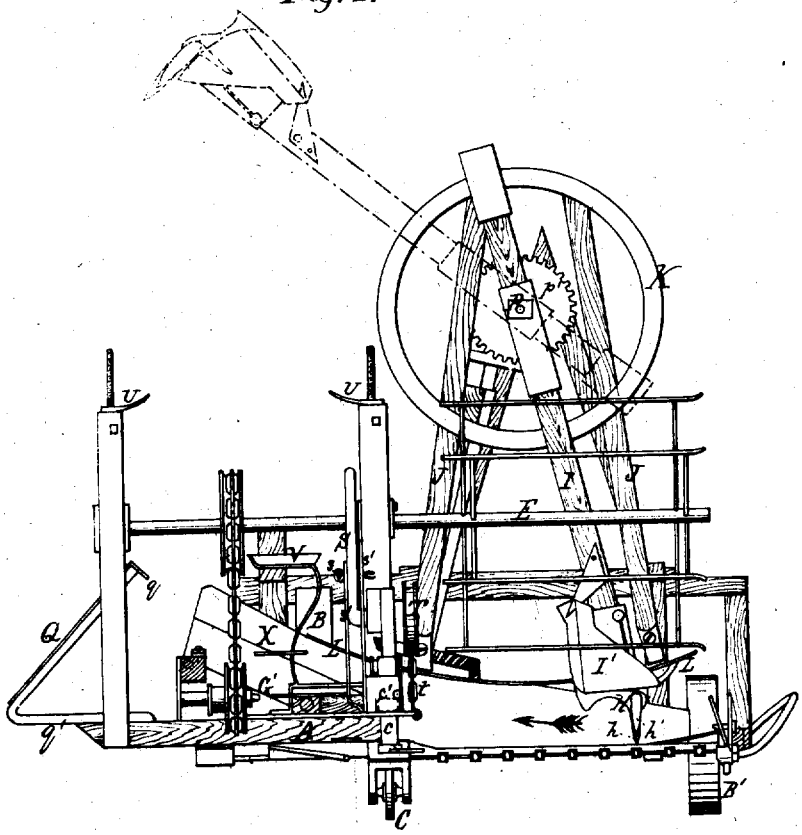
Figure 4:
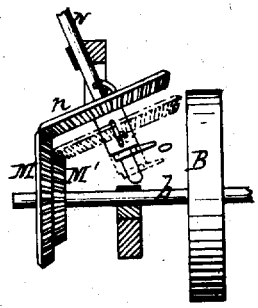

Figure 1 is a plan or top view of a harvesting-machine with my improvements. Fig. 2 is a front elevation of the same. Fig. 3 is a transverse section through finger-bar, cutters, and grain-platform, showing the rake in side elevation; and Fig. 4 is a detached view of a portion of the rake-gearing hereinafter described.

Similar letters of reference indicate corresponding parts in all the figures where used.

The invention consists, first, in the combination, with an inclined elevating surface at the inner end of the platform, and cutting apparatus which is extended in advance of the line of cut, of an elevating mechanism the forward part or tooth of which shall move up said incline in advance of the line of the bar to which the fingers are attached, for carrying up the butts of the grain; second, in a novel construction of the rake for removing the grain; third, in devices for regulating the movements of the rake; and, fourth, in a novel means for preventing the displacement or scattering of the grain, as hereinafter described.

In the accompanying drawings, A represents the main frame of the machine; B, the driving-wheel; B′, the outer carrying or grain wheel; C, an adjustable caster-wheel; D, the draft-pole, and E the reel. F F′ is the cutting apparatus, which may be constructed and operated in any suitable manner. G is the grain-platform, composed of slats curved vertically; and G′ is an elevating incline at the inner end of the grain-platform, and forming an extension thereof, up which the grain is carried to the outer or stubble side of the machine. The main frame, at the inner end of the platform G, is extended in front of the cutting apparatus, to permit the extension of the elevating incline G′ also, which is thus expanded in width from front to rear, its forward edge, together with the vertical fender or shield, which prevents the escape of the grain in front of the incline, being thus brought in advance of the line of cut in such manner as not to obstruct the passage up the incline of such butts of the grain as may overhang the finger-bar F. H represents the rake, mounted in the end of an arm, I, which is pivoted in the upper part of an upright frame, J. K is a circular guide, affording lateral support to the arm I, to permit its rotation for bringing the teeth into an effective position for removing the grain, and of their being then withdrawn or retracted to free them from the grain as it is discharged. *j* is a spring, employed for retracting the rake and holding its lever-arm against a stop-pin, $j^1$, with its teeth at right angles to the arm I, as shown in Fig. 1, and in dotted lines, Fig. 2. An arm or lever, $j^2$, secured to the pivoted rake-head, passes underneath a ledge or flange, L, for holding the rake-teeth in working position while passing over the platform and up the elevating incline G′, as shown in Fig. 3, and by the full lines, Fig. 2.

The rake-teeth *h* enter the slots formed between the slats of the platform and incline G′, the forward tooth *h′* of the rake moving up the incline G′ in advance of the line of the bar, to which the fingers are attached for acting on the butts of the grain.

I′ is a yielding hood, pivoted upon and covering the rake, and pressed outward by a spring, *i*. The office of this hood is to increase the efficiency of the rake by pressing upon the grain and holding it in a compact body in front of the rake. The shaft *b* of the driving-wheel carries two gears, M M′, of unequal diameters. N is an inclined shaft journaled in the frame J. *n* is a bevel-gear fitted loosely upon the shaft N, but caused to turn therewith when the machine is moving forward, by means of a slotted clutch-sleeve, *n′*, sliding upon a pin or feather on the shaft, and formed with ratchet-teeth, which take into corresponding teeth on the hub of the wheel *n*. O is a nut, by means of which the sleeve *n′* may be set up or down on the shaft N, causing the wheel *n* to mesh with either wheel, M or M′, to regulate the motion of the rake, or for throwing it out of gear altogether. These parts are more clearly shown in Fig. 4, where the upper position of the wheel *n* is shown in black, and the lower position in dotted lines. The motion of the inclined shaft N is communicated, through gearing *p p′*, to the horizontal shaft P, of the rake-arm I. Q is an inclined plate, formed with a flange and serving to catch the grain as it is raked from the platform, to prevent its being scattered, and for depositing it compactly on the ground. *q′* is a bar by which the plate Q is attached to the platform. W is a fender which deflects the standing grain out of reach of the rake. The direction in which the rake revolves is shown by the arrow. *r* is a guide covering the back of the cutter-bar, and forming a ledge projecting so far above the finger-bar and platform as to uphold the butts of the cut grain and prevent them from choking the cutters. The height of the finger-bar and the platform is regulated by means of a hand-lever, S, fulcrumed in the upper part of the standard *c* of the caster-wheel C, and carrying a grooved pulley, T, to the periphery of which is attached a chain, *t*, connected at its lever-end to the front of the main frame. The front of the machine is thus suspended from the pulley T, and, by depressing the hand-lever S, the cutting apparatus may be raised to any height. *s* is a key, which, passing through holes in the brackets *s′*, retains the lever S in any position desired. To lessen the friction in thus raising and lowering the front of the machine, the standard C works between the rollers *c′ c′*. The reel is adjusted in height by means of set-nuts U, upon hangers attached to the bearings in which the reel turns. V is the driver's seat. X is the vertical fender-board or shield projecting upward at the forward edge of the elevating-incline G′, for preventing the cut grain from passing off the platform in front. Said board is placed so far in advance of the line of the cutters as not to endanger the stopping of the butts of the grain. Y is a similar shield or board at the rear of the incline for preventing the grain from escaping at the rear.

Having now described the invention, what is claimed as new, and sought to be secured by Letters Patent, is—

1. An inclined elevating-surface at the inner end of the platform and cutting apparatus, extended in advance of the line of cut, in combination with an elevating mechanism, the forward part or tooth of which shall move up said incline in advance of the line of the bar to which the fingers are attached.

2. In the described combination with the vertically-curved platform G, the rake H, pivoted to and projecting horizontally forward from the rake-arm I, by which it is carried in a vertical orbit, all as herein shown and described.

3. The guide L and spring *h*, operating in the described combination with the pivoted rake-head H, to present it in the proper position to gather the grain and afterward retract it therefrom.

4. The fender Q, employed in combination with the pivoted rake H, in the manner and for the purpose specified.

5. The yielding hood *i*, operating in combination with the revolving rake H I, substantially as and for the purpose explained.

6. A platform constructed of vertically-curved slats, placed transversely of the machine at sufficient distance apart to admit the points of the rake-teeth between them, when used in combination with the rake H I, revolving in a vertical orbit, all as herein shown and described.

JOHN RYNEARSON.

Witnesses:

THOMAS CAYWOOD,
G. H. SOUTHWOOD.